US012716402B2

(12) United States Patent
Sun et al.

(10) Patent No.: US 12,716,402 B2
(45) Date of Patent: Aug. 25, 2026

(54) POLYMER-BASED TURGOR PRESSURE ACTUATOR, AND DRIVING METHOD AND USE THEREOF

(71) Applicant: Seoul National University R&DB foundation, Seoul (KR)

(72) Inventors: Jeong-Yun Sun, Seoul (KR); Ho-Young Kim, Seoul (KR); Hyeonuk Na, Seoul (KR); Yong-Woo Kang, Seoul (KR); Chang Seo Park, Seoul (KR); Sohyun Jung, Gyeonggi-do (KR)

(73) Assignee: Seoul National University R&DB foundation, Seoul (KR)

( * ) Notice: Subject to any disclaimer, the term of this patent is extended or adjusted under 35 U.S.C. 154(b) by 25 days.

(21) Appl. No.: 18/835,958

(22) PCT Filed: Apr. 5, 2023

(86) PCT No.: PCT/KR2023/004575
§ 371 (c)(1),
(2) Date: Feb. 10, 2025

(87) PCT Pub. No.: WO2023/195763
PCT Pub. Date: Oct. 12, 2023

(65) Prior Publication Data

US 2025/0382948 A1 Dec. 18, 2025

(30) Foreign Application Priority Data

Apr. 6, 2022 (KR) ........................ 10-2022-0043005
Apr. 4, 2023 (KR) ........................ 10-2023-0044387

(51) Int. Cl.
*F03G 7/06* (2006.01)

(52) U.S. Cl.
CPC ................................. *F03G 7/0612* (2021.08)

(58) Field of Classification Search
CPC .................................................... F03G 7/0612
See application file for complete search history.

(56) References Cited

U.S. PATENT DOCUMENTS

2007/0196492 A1* 8/2007 Ito ........................ C08L 101/14 424/486
2018/0163707 A1* 6/2018 Kaneko ................ F03G 7/0612
(Continued)

FOREIGN PATENT DOCUMENTS

JP 2001-258275 9/2001
JP 2005-264046 9/2005
(Continued)

OTHER PUBLICATIONS

International Search Report mailed Jul. 14, 2023 for PCT/KR2023/004575, 4 pages.

(Continued)

*Primary Examiner* — Hoang M Nguyen

(57) ABSTRACT

The present disclosure provides a polymer-based turgor actuator including a polymer network member (hereinafter, polymer member) capable of absorbing liquid and swelling, and a permeable confinement member configured to physically constrain the polymer member by confining it in an internal accommodation space and having liquid permeability, wherein an acceptable volume of the internal accommodation space of the permeable confinement member is smaller than the maximum swelling volume of the polymer member in the absence of the permeable confinement member.

14 Claims, 17 Drawing Sheets

(56) References Cited

U.S. PATENT DOCUMENTS

| | | | | |
|---|---|---|---|---|
| 2019/0376495 | A1* | 12/2019 | Kaneko | H02N 10/00 |
| 2021/0305917 | A1* | 9/2021 | Sakurai | H02N 10/00 |

FOREIGN PATENT DOCUMENTS

| | | |
|---|---|---|
| KR | 10-2025864 | 11/2019 |
| WO | WO 2019-208576 | 11/2019 |

OTHER PUBLICATIONS

Le, X. Recent Progress in Biometric Anisotropic Hydrogel Actuators, Adv. Sci. Jan. 15, 2019, vol. 6, 1801584, pp. 1-14, 14 pages.

* cited by examiner

< Comparative example >

FIG. 5

FIG. 13
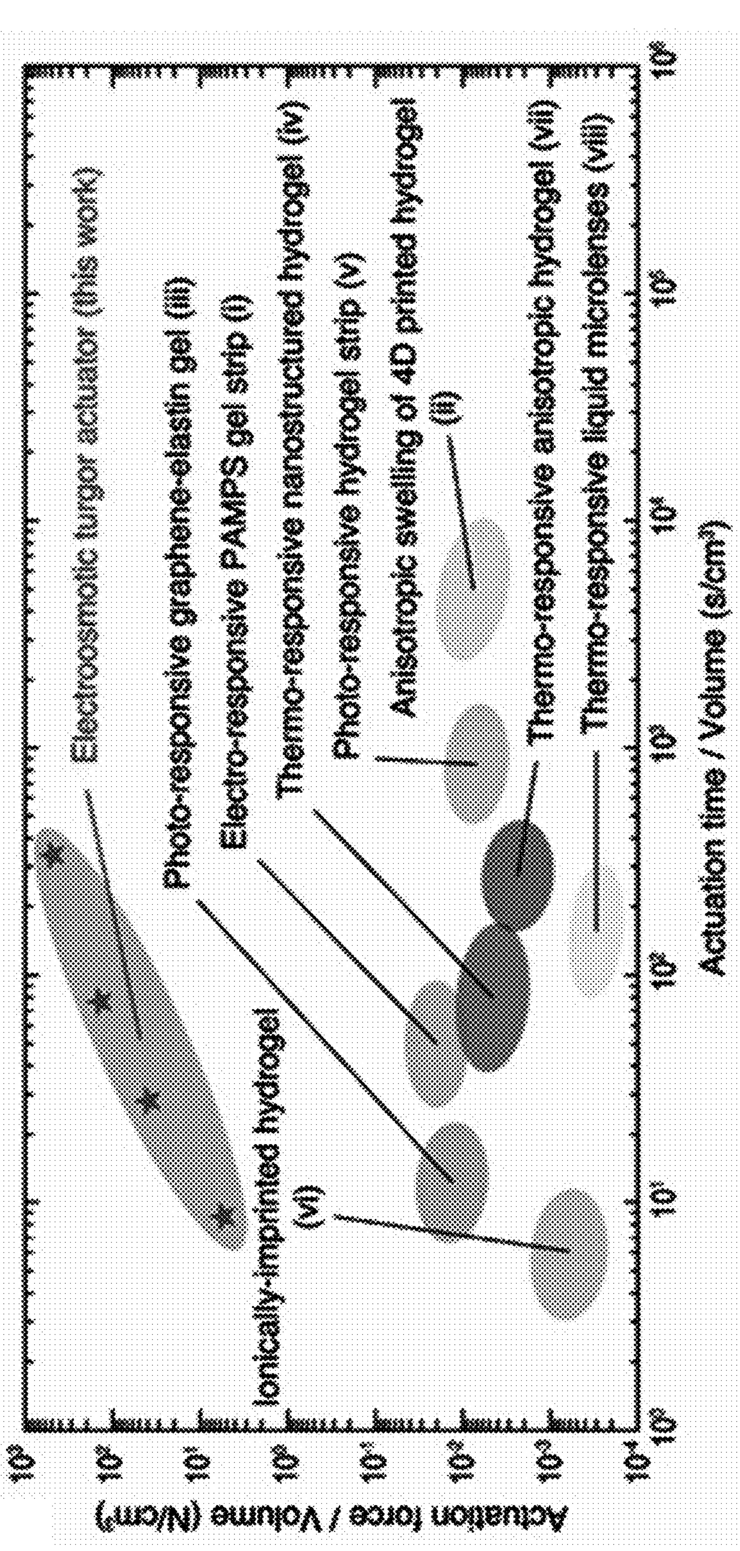

< Comparative example >

FIG. 20
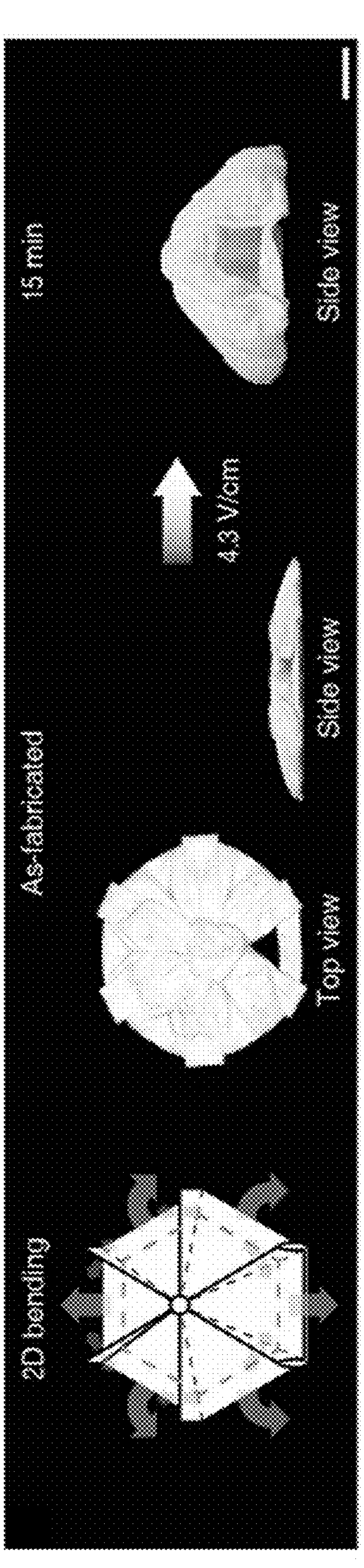

POLYMER-BASED TURGOR PRESSURE ACTUATOR, AND DRIVING METHOD AND USE THEREOF

This application claims the priority of Korean Patent Application No. 10-2022-0043005, filed on Apr. 6, 2022, and 10-2023-0044387, filed on Apr. 4, 2023 in the KIPO (Korean Intellectual Property Office), the disclosure of which is incorporated herein entirely by reference. Further, this application is the National Stage application of International Application No. PCT/KR2023/004575, filed on Apr. 5, 2023, which designates the United States and was published in Korean. Each of these applications is hereby incorporated by reference in their entirety into the present application.

TECHNICAL FIELD

The present invention relates to an actuator, its driving method and application thereof, and more particularly, to a polymer-based turgor actuator, its driving method and application thereof.

BACKGROUND ART

As the polymer networks have a high degree of freedom and may adapt to and interact with complex environments, they are being actively studied as soft actuators. The polymer network may self-swell through osmosis with the surrounding solution, and is a substance which may shrink or swell in response to various stimuli such as light, pH, and electric fields by controlling the end groups of the polymer chain, and it may be used as an actuator by taking advantage of the large volume swelling of the substance.

However, it has been difficult for the existing soft actuators to generate large forces due to the inherent low elastic modulus and low modulus of failure of the polymer network, and as the shrinkage/swelling of the network based on the osmosis phenomenon depends on the diffusion of the solvent, the slow transformation speed greatly limited its usability. In order to utilize the transformation of functional polymers practically, it is very important to be able to generate a large force at a fast transformation speed. Conventionally, the methods have been attempted to increase the transformation speed of polymers through porous network production, anisotropic polymer network synthesis, and reactive particle insertion, but research on simultaneously improving the speed and force of soft actuators is insufficient.

DISCLOSURE OF THE INVENTION

Technical Problem

The technological object to be achieved by the present invention is to provide a polymer-based turgor actuator (a type of soft actuator) which may remarkably improve mechanical output performance (force, speed).

In addition, the technological object to be achieved by the present invention is to provide a polymer-based turgor actuator which may generate a large force at a high speed.

In addition, the technological object to be achieved by the present invention is to provide a polymer-based turgor actuator which may easily control a generated force, operation speed, and rigidity (hardness).

In addition, the technological object to be achieved by the present invention is provide a polymer-based turgor actuator which may be manufactured in a state which may be easily handled because of a compact size and a light weight, may be easily transported, and may act as a fixture with strong force, or form a hard/rigid structure by absorbing liquid (solvent) on its own in an underwater/on-water environment without a pump, a connection device, or an electrically driven equipment after transport.

In addition, the technological object to be achieved by the present invention is to provide a method for driving the polymer-based turgor actuator.

In addition, the technological object to be achieved by the present invention is to provide a structure (underwater/floating structure) to which the polymer-based turgor actuator is applied.

The objects to be solved by the present invention are not limited to the objects mentioned above, and other objects not mentioned will be understood by those skilled in the art from the description below.

Technical Solution

According to one embodiment of the present invention, there is provided a polymer-based turgor actuator comprising: a polymer network member (hereinafter, polymer member) capable of absorbing liquid and swelling; and a permeable confinement member configured to physically constrain the polymer member by confining it in an internal accommodation space and having liquid permeability, wherein an acceptable volume of the internal accommodation space of the permeable confinement member is smaller than the maximum swelling volume of the polymer member in the absence of the permeable confinement member.

The acceptable volume of the internal accommodation space of the permeable confinement member may be about 60% or less of the maximum swelling volume of the polymer member in the absence of the permeable confinement member.

The acceptable volume of the internal accommodation space of the permeable confinement member may be larger than an initial volume before swelling of the polymer member.

The permeable confinement member may have an elastic modulus of about 1 MPa or more.

The permeable confinement member may include a permeable membrane surrounding the polymer member.

The permeable confinement member may have a mesh structure.

The polymer member may be configured to absorb liquid and to swell through osmosis phenomenon or electroosmosis phenomenon.

The polymer member may include a polymer electrolyte, and the polymer-based turgor actuator may further include an electric field application device for applying an electric field to the polymer member.

According to another embodiment of the present invention, there is provided a method for driving the polymer-based turgor actuator described above, which includes immersing the polymer-based turgor actuator in a liquid or contacting it with a liquid.

The method may further include applying an electric field to the polymer member of the polymer-based turgor actuator.

According to another embodiment of the present invention, an underwater structure configured by applying the above-described polymer-based turgor actuator is provided.

According to another embodiment of the present invention, a floating structure configured by applying the above-described polymer-based turgor actuator is provided.

Advantageous Effects

According to the embodiments of the present invention, it is possible to implement a polymer-based turgor actuator which may remarkably improve mechanical output performance (force, speed). Furthermore, according to the embodiments of the present invention, it is possible to implement a polymer-based turgor actuator capable of generating a large force at a high speed. In addition, according to the embodiments of the present invention, it is possible to implement a polymer-based turgor actuator which may easily control a generated force, an operation speed, and rigidity (degree of hardness).

According to the embodiments of the present invention, the mechanical output performance (force, speed) of the polymer actuator may be greatly improved. A swelling pressure may be formed to generate mechanical output by confining a polymer network member capable of self-swelling within a permeable confinement member (e.g., permeable membrane) and swelling the polymer network member through osmosis or electroosmosis. For example, a force equal to the osmotic pressure equivalent to about several MPa may be generated even without external power, and when using electrical energy, a large force may be generated at a much faster speed. Furthermore, since the swollen actuator generates a very large swelling pressure, it may be utilized as a rigid structure. In addition, a force, an operation speed, rigidity, and the like generated by the actuator may be easily controlled by adjusting the volume or physical properties of the permeable confinement member (e.g., permeable membrane) and/or the volume or physical properties of the polymer network member.

In addition, according to the embodiments of the present invention, it is possible to implement a polymer-based turgor actuator which may be manufactured in a state that is easy to handle because of a compact volume and a light weight, and thus, may be easily transported, and may act as a fixture with strong force or form a hard/rigid structure by absorbing a liquid (solvent) on its own in an underwater/on-water environment without a pump, a connection device, or an electrically driven equipment after transportation. It is expected that the polymer-based turgor actuator according to these embodiments will be able to overcome the limitations of existing construction.

Recently, interests in floating buildings and underwater cities are increasing because of rising sea levels due to global warming, increased income, and increased demand for marine leisure sports due to changes in tourism behavior. The embodiments of the present invention may be used in actuators which may be driven underwater/on the water and underwater/floating structures, and may be usefully applied to floating buildings and underwater city projects.

Construction in underwater environments (e.g. bridges, undersea tunnels, and the like) requires complex and difficult processes, unlike land-based construction, because the use of electrically driven equipment is limited, and buoyancy must be taken into account. The actuator proposed in this embodiment of the present invention is easy to handle due to its small volume and lightness, and may overcome the limitations of existing construction by absorbing the underwater environment and forming a hard/rigid structure without the need for electrically driven equipment.

In addition, the embodiments of the present invention may be applied to all application fields of soft actuators using polymer networks, such as artificial muscles, soft robotics, and biomedical engineering.

However, the effects of the present invention are not limited to the above effects and may be expanded in various ways without departing from the technological spirit and scope of the present invention.

BRIEF DESCRIPTION OF THE DRAWINGS

FIG. 5 is a perspective view illustrating a method of manufacturing a polymer-based turgor actuator according to an embodiment of the present invention.

FIG. 13 is a graph comparing a force and a speed of the polymer-based turgor actuator according to an embodiment of the present invention and existing soft actuators.

FIG. 20 is a diagram showing a process for manufacturing a structure (actuator) which performs bending actuation by applying a polymer-based turgor actuator according to an embodiment of the present invention.

BEST MODE FOR CARRYING OUT THE INVENTION

Figure 1:
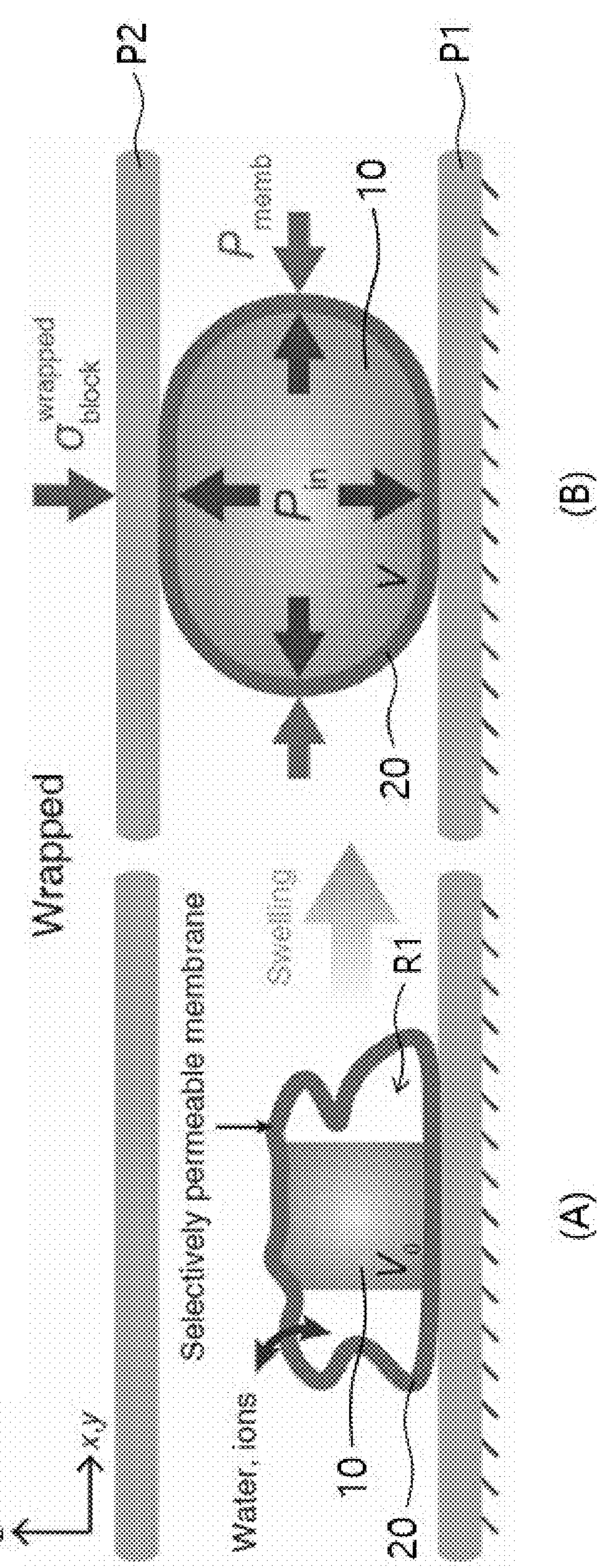
FIG. 1 is a cross-sectional view for explaining a polymer-based turgor actuator according to an embodiment of the present invention.

Hereinafter, the embodiments of the present invention will be described in detail with reference to the accompanying drawings.

The embodiments of the present invention to be described below are provided to more clearly explain the present invention to those having common knowledge in the related art, and the scope of the present invention is not limited by the following embodiments. The following embodiment may be modified in many different forms.

The terminology used herein is used to describe specific embodiments, and is not used to limit the present invention. As used herein, terms in the singular form may include the plural form unless the context clearly dictates otherwise. Also, as used herein, the terms “comprise” and/or “comprising” specifies presence of the stated shape, step, number, action, member, element and/or group thereof; and does not exclude presence or addition of one or more other shapes, steps, numbers, actions, members, elements, and/or groups thereof. In addition, the term “connection” as used herein is a concept that includes not only that certain members are directly connected, but also a concept that other members are further interposed between the members to be indirectly connected.

In addition, in the present specification, when a member is said to be located “on” another member, this includes not only a case in which a member is in contact with another member but also a case in which another member is present between the two members. As used herein, the term “and/or” includes any one and any combination of one or more of those listed items. In addition, as used herein, terms such as “about”, “substantially”, etc. are used as a range of the numerical value or degree, in consideration of inherent manufacturing and substance tolerances, or as a meaning close to the range. Furthermore, accurate or absolute numbers provided to aid the understanding of the present application are used to prevent an infringer from using the disclosed present invention unfairly.

Hereinafter, the embodiments of the present invention will be described in detail with reference to the accompanying drawings. The size or the thickness of the regions or the parts illustrated in the accompanying drawings may be slightly exaggerated for clarity and convenience of description. The same reference numerals refer to the same elements throughout the detailed description.

FIG. 1 is a cross-sectional view for explaining a polymer-based turgor actuator according to an embodiment of the present invention.

Referring to FIG. 1, the polymer-based turgor actuator according to an embodiment of the present invention may include a polymer network member (hereinafter, a polymer member) 10 capable of absorbing liquid and swelling, and a permeable confinement member (permeable restraint member/permeable constraint member) 20 configured to physically constrain the polymer member by confining it in an internal accommodation space R1 and having liquid permeability. The permeable confinement member 20 may have permeability to liquid and ions, that is, liquid and ion permeability.

The polymer member 10 may be a polymer material member in which a plurality of monomers form a chain and form a network through crosslinking. The polymer member 10 may have a predetermined volume. The polymer member 10 may have various shapes such as a polyhedron (e.g., hexahedron, etc.), sphere, hemisphere, polygonal pyramid (e.g., triangular pyramid, etc.), cone, polygonal pillar, cylinder, or plate-shaped structure. The polymer member 10 may have any shape. For example, the polymer member 10 may include at least any one selected from the group consisting of hydrogel, elastomer, polyelectrolyte, etc. All polymer materials used in general polymer actuators may be applied to the polymer member 10.

The polymer member 10 may absorb surrounding liquid and swell on its own. The polymer member 10 may be configured to absorb liquid and swell through an osmosis phenomenon or an electroosmosis phenomenon. In this case, the network of the polymer member 10 itself may function as a semipermeable membrane and serve as a solute. The driving force which allows the polymer member 10 to swell while absorbing the surrounding liquid (solvent) may be osmotic pressure, and the osmotic pressure may be a very large force, for example, reaching several MPa. The swelling pressure (turgor pressure) may be transmitted as mechanical output to drive the polymer-based turgor actuator by swelling the polymer member 10 inside the permeable confinement member 20 through osmosis or electroosmosis.

The permeable confinement member 20 may serve to surround the polymer member 10 and confine the polymer member 10 to the internal accommodation space R1. The permeable confinement member 20 may be configured to completely surround the polymeric member 10. The permeable confinement member 20 may be configured to allow liquid to pass through while physically binding the polymer member 10. Movement of liquid (solvent) and ions may be possible through the permeable confinement member 20. The liquid may include water, an aqueous solution, or an organic solvent. The permeable confinement member 20 may be configured so that a portion of the polymer member 10 may not escape to the outside of the permeable confinement member 20 when the polymer member 10 therein is swollen. The permeable confinement member 20 may have a flexible substance configuration which may be freely changed to some extent. The permeable confinement member 20 may be formed of any polymer (plastic) material.

The permeable confinement member 20 may include or be composed of a permeable membrane wrapping the polymer member 10. The permeable membrane may be referred to as a ‘selectively permeable membrane’. As a non-limiting example, the permeable membrane may include at least any one selected from woven fabric, nonwoven fabric, elastomer, and hydrogel. For example, the permeable membrane may include a commercial dishcloth or a similar substance composition, but embodiments of the present invention are not limited thereto. Meanwhile, the permeable confinement member 20 may have a thickness of, for example, several tens of μm to several tens of mm.

According to one embodiment, the permeable confinement member 20 may have a mesh structure for liquid permeability. The mesh structure may be a relatively fine (dense) structure, and it may serve to prevent a portion of the polymer member 10 from escaping to the outside of the permeable confinement member 20 when the polymer member 10 is swollen. The appropriate scale of the mesh structure may vary depending on the material of the polymer member 10 and the type of liquid. The permeable confinement member 20 may be configured so that its entire constituent parts excluding pores (penetrating parts) that transmit liquid may completely physically surround and confine the polymer member 10. The permeable confinement member 20 may also be referred to as a type of envelope or envelope membrane.

According to one embodiment, the permeable confinement member 20 may have a relatively large elastic modulus. For example, the permeable confinement member 20 may have an elastic modulus of about 1 MPa or more. As a specific example, the permeable confinement member 20 may have an elastic modulus in the range of about 1 MPa to 100 GPa. The permeable confinement member 20 may not be easily stretched by external force and may have relatively tough and hard properties. Accordingly, even if the polymer member 10 is swollen in the internal accommodation space R1, the permeable confinement member 20 may not be stretched or may hardly be stretched due to the swelling of the polymer member 10. The permeable confinement member 20 may withstand the osmotic pressure of the polymer member 10 due to its high elastic stress and may maintain a high osmotic pressure in an equilibrium state.

Drawing (A) of FIG. 1 shows the polymer-based turgor actuator in its initial state in which the polymer member 10 is not swollen. At this time, the volume of the polymer member 10 may be referred to as $V_0$. Drawing (B) of FIG. 1 shows the polymer-based turgor actuator in a fully (maximally) swollen state until the polymer member 10 reaches equilibrium in the internal accommodation space R1 of the permeable confinement member 20. At this time, the volume of the polymer member 10 may be referred to as V. In FIGS. 1, P1 and P2 represent plates for pressure measurement. P1 may be said to be a first plate, and P2 may be said to be a second plate. The first plate P1 and the second plate P2 may be arranged to be spaced apart from each other in the z-axis direction in the drawing, and the polymer-based turgor actuator according to an embodiment may be placed between P1 and P2. For convenience, the x-axis and γ-axis are indicated as the same axis in the direction coordinates, but in reality, the x-axis and γ-axis may be axes perpendicular to each other. The initially loose permeable confinement member 20 may be filled with the polymer member 10 due to swelling of the polymer member 10, and the polymer member 10 and the permeable confinement member 20 may form a very rigid structure. Therefore, it is possible to create a structure which is strong as compared to the volume of the used polymer member 10.

The acceptable volume (accommodatable volume) of the internal accommodation space R1 of the permeable confinement member 20 may be smaller than the maximum swelling volume of the polymer member 10 in the case where the permeable confinement member 20 is not present. In other words, the acceptable volume of the internal accommodation space R1 of the permeable confinement member 20 may be smaller than the volume at which the polymer member 10 may swell to a maximum under the condition without constraint due to the permeable confinement member 20. Here, the acceptable volume may be a volume that the internal accommodation space R1 may accommodate at its maximum. In other words, the acceptable volume may be defined as the volume of the internal accommodation space R1 when the polymer member 10 is completely swollen (to the maximum) within the internal accommodation space R1 and reaches an equilibrium state.

According to one embodiment, the acceptable volume of the internal accommodation space R1 of the permeable confinement member 20 may be about 60% or less, or about 50% or less of the maximum swelling volume of the polymer member 10 in the case where the permeable confinement member 20 is not present. In other words, the acceptable volume of the internal accommodation space R1 of the permeable confinement member 20 may be about 60% or less, or about 50% or less of the volume at which the polymer member 10 may swell to a maximum under the condition of no constraint due to the permeable confinement member 20. When these conditions are met, the polymer-based turgor actuator according to the embodiment may be more advantageous in generating a large force.

Furthermore, according to one embodiment, the acceptable volume of the internal accommodation space R1 of the permeable confinement member 20 may be larger than the initial volume before swelling of the polymer member 10, that is, $V_0$. Here, the initial volume before swelling may mean the volume before the polymer-based turgor actuator is immersed in or contacted with a liquid to cause volume swelling of the polymer member 10 by the liquid. A force and an operation speed generated by the polymer-based turgor actuator may be adjusted by appropriately controlling the acceptable volume while enabling the acceptable volume to be larger than the initial volume before swelling of the polymer member 10.

In the drawing (B) of FIG. 1, $P_{in}$ represents the internal pressure generated by the polymer member 10, $P_{memb}$ represents the pressure acting on the permeable confinement member 20 in the x- and y-axis directions, and $\sigma_{wrapped\ block}$ represents a blocking stress acting in the z-axis direction. Since the first and second plates P1 and P2 have a gap narrower than the maximum swelling volume of the polymer member 10, a pressure is applied between the first and second plates P1 and P2 in the z-axis direction due to swelling of the polymer member 10.

Figure 2:
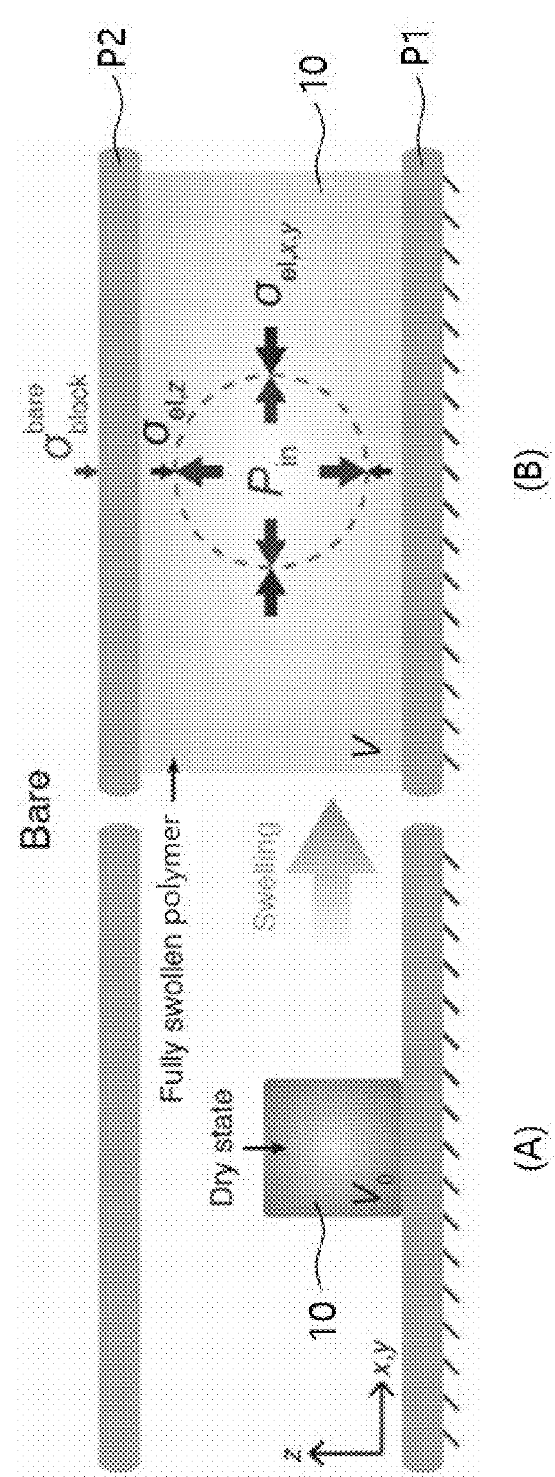
FIG. 2 is a cross-sectional view for explaining a polymer actuator according to a comparative example.

FIG. 2 is a cross-sectional view for explaining a polymer actuator according to a comparative example.

Referring to FIG. 2, the polymer actuator according to the comparative example may be composed of only a polymer member (polymer network member) 10 without the permeable confinement member 20 described in FIG. 1. The polymer member 10 may absorb liquid between the first plate P1 and the second plate P2 and may swell. Drawing (A) of FIG. 2 shows the polymer actuator in its initial state in which the polymer member 10 is not swollen. At this time, the volume of the polymer member 10 may be referred to as $V_0$. Drawing (B) of FIG. 2 shows the polymer actuator with the polymer member 10 fully (maximally) swollen until the polymer member 10 is in an equilibrium state. At this time, the volume of the polymer member 10 may be referred to as V. Here, V may be different from V in FIG. 1.

In the drawing (B) of FIG. 2, $P_{in}$ represents the internal pressure generated by the polymer member 10, $\sigma_{el,x,y}$ represents the elastic stress acting in the x-axis and γ-axis directions with respect to the polymer member 10, $\sigma_{el,z}$ represents elastic stress acting in the z-axis direction with respect to the polymer member 10, and $\sigma_{bare\ block}$ represents blocking stress acting in the z-axis direction. $\sigma^{bare\ block}$ may correspond to the pressure applied between the first and the second plate P1 and P2 in the z-axis direction due to swelling of the polymer member 10.

In the polymer actuator according to the above comparative example, as the osmotic pressure at the beginning of swelling is very high, but the elastic stress which suppresses the swelling of the polymer chains is only a few kPa, the polymer member 10 swells, its concentration becomes lighter on its own and reaches a low osmotic pressure. The osmotic pressure in the equilibrium state is nothing more than the elastic stress of the polymer chain, and may only produce a force based on the weak elastic stress of the polymer network. Therefore, the force which the polymer actuator according to the comparative example may produce is very small.

However, as in the embodiment of the present invention described in FIG. 1, when the polymer member 10 is swelled while confining the polymer member 10 by using the permeable confinement member 20, the high elastic stress of the tough permeable confinement member 20 may withstand osmotic pressure instead by replacing the elastic stress of the polymer chain, and high osmotic pressure may be maintained in an equilibrium state. Therefore, the force which the polymer-based turgor actuator may produce is an osmotic pressure of the polymer member 10 in equilibrium within the permeable confinement member 20, and for example, a force of several MPa or more may be generated only by the chemical energy of the substance itself without any external power. In other words, the polymer-based turgor actuator may generate a large force by utilizing a high osmotic pressure.

Furthermore, according to another embodiment of the present invention, the polymer member may be swollen more quickly by adding electroosmosis to osmotic pressure-based swelling, and a turgor actuator which may generate a large force at a high speed may be implemented. When the polymer member 10 is configured to absorb liquid and swell based on an electroosmosis phenomenon, that is, when the polymer member 10 includes a polymer electrolyte (polyelectrolyte), the polymer-based turgor actuator according to the embodiment may further include an electric field application device for applying an electric field to the polymer member 10. It is possible to increase a swelling speed of the polymer member 10 according to the liquid by applying an electric field to the polymer member 10 using the electric field application device, and as a result, the operation speed of the polymer-based turgor actuator may be increased. Since the specific configuration of the electric field application device may be the same or similar to a well-known electric field application device, the detailed description thereof will be omitted.

Figure 3:
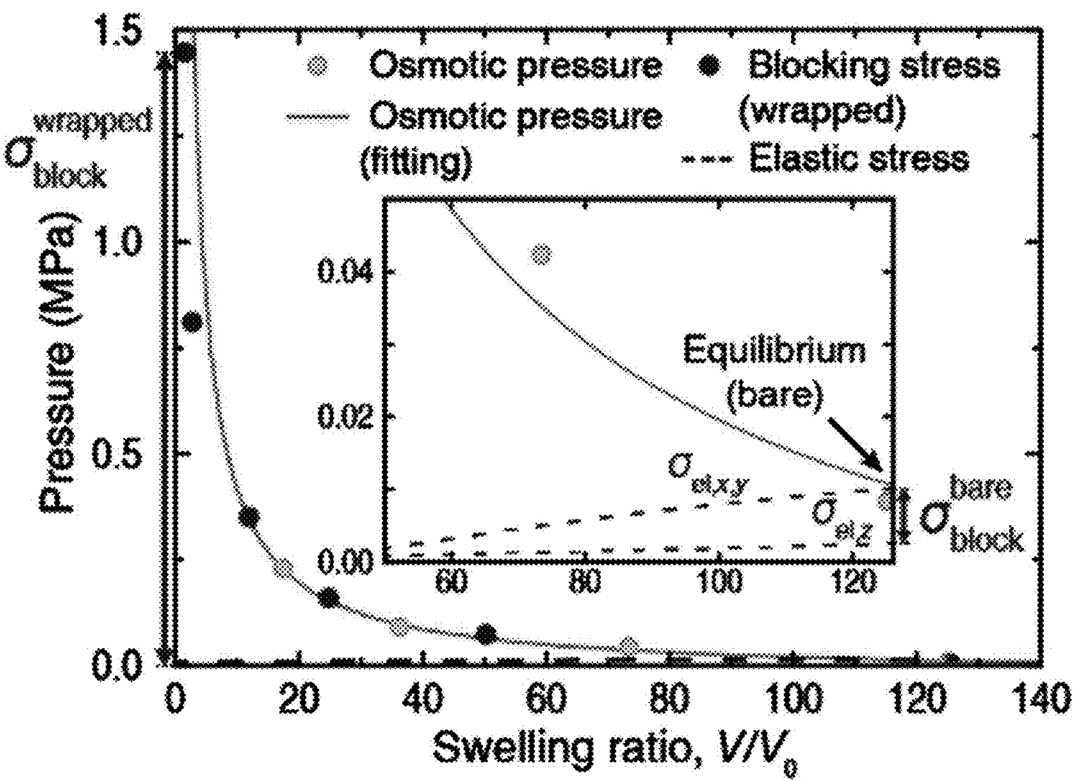
FIG. 3 is a graph illustrating the results obtained by measuring the changes in osmotic pressure and elastic stress according to the swelling ratio ($V/V_0$) of a polymer member (polymer network member) in a polymer-based turgor actuator according to an embodiment of the present invention and a polymer actuator according to a comparative example.

FIG. 3 is a graph illustrating the results obtained by measuring the changes in osmotic pressure and elastic stress according to the swelling ratio ($V/V_0$) of a polymer member (polymer network member) in a polymer-based turgor actuator according to an embodiment of the present invention and a polymer actuator according to a comparative example. The inset in FIG. 3 is an enlarged view of some areas.

Referring to FIG. 3, the osmotic pressure of the polymer member at the initial stage of swelling according to an embodiment of the present invention may reach, for example, several MPa, and as the polymer member swells, the osmotic pressure may rapidly decrease. In the case where there is no permeable confinement member (i.e., in the case of the comparative example), the osmotic pressure of the polymer member in an equilibrium state may become equal to the elastic stress of the polymer chain of, for example, several kPa. However, when a permeable confinement member is used (i.e., in the embodiment), the polymer member may maintain a high osmotic pressure at equilibrium depending on the swelling ratio ($V/V_0$). The results in FIG. 3 are related to a certain polymer member, and the measured value may vary depending on a material composition, a shape, a size, etc. of the polymer member.

According to one embodiment of the present invention, as a non-limiting example, the swelling ratio of the polymer member may be about 70 or less or about 60 or less. Furthermore, the swelling ratio of the polymer member may be greater than 1. Accordingly, the swelling ratio of the polymer member may be greater than 1 and 70 or less, or greater than 1 and 60 or less. However, the appropriate range of the swelling ratio may vary depending on the case.

Figure 4:
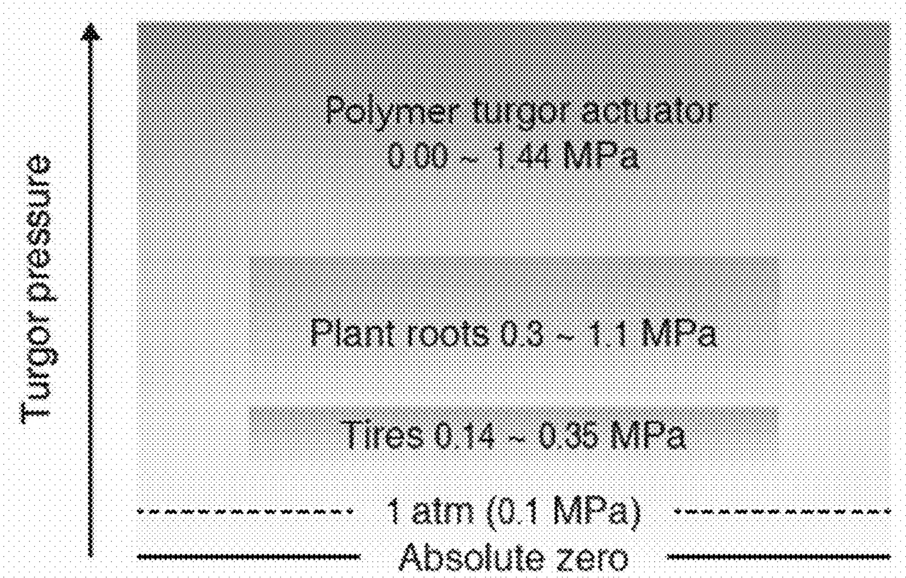
FIG. 4 is a graph showing a turgor pressure (swelling pressure) of the polymer-based turgor actuator when compared to the turgor pressure (swelling pressure) of plants and tires.

FIG. 4 is a graph showing a turgor pressure (swelling pressure) of the polymer-based turgor actuator when compared to the turgor pressure (swelling pressure) of plants and tires.

Referring to FIG. 4, the range of turgor pressure which may be obtained from the polymer-based turgor actuator may be 0 to 1.44 MPa, and it is confirmed that this range is larger and covers a wider range than the turgor pressure generated in plant roots and turgor pressure generated in tires. The polymer-based turgor actuator is a hydrogel turgor actuator, and at this time, the swelling ratio was assumed to be in the entire range.

Figure 5:
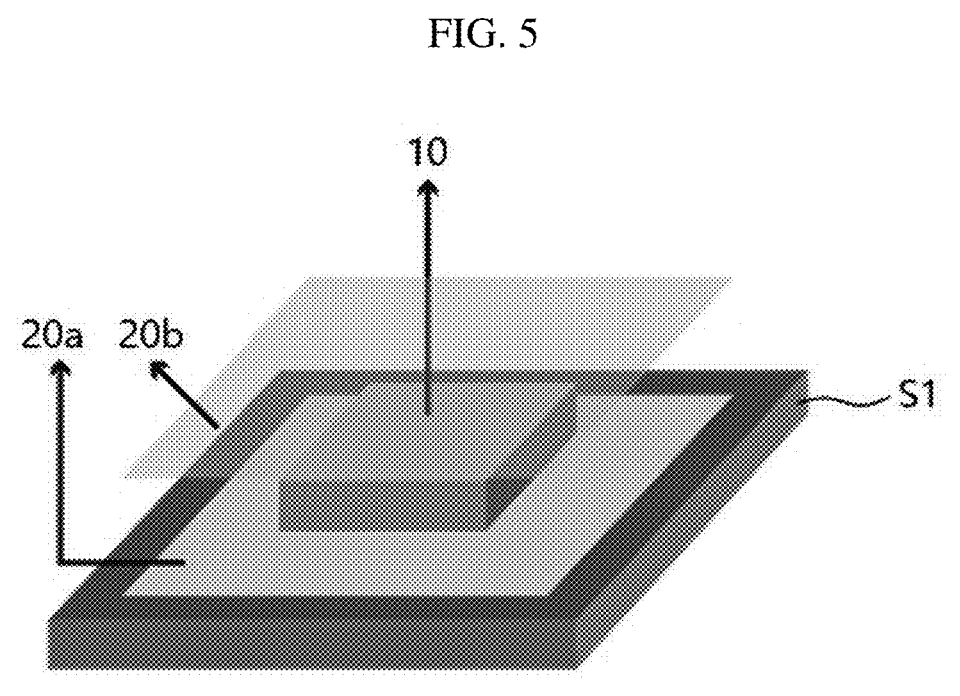

FIG. 5 is a perspective view illustrating a method of manufacturing a polymer-based turgor actuator according to an embodiment of the present invention.

Referring to FIG. 5, a first member 20*a* for a permeable confinement member may be placed on a predetermined support unit S1, and a polymer network member (hereinafter, referred to as a polymer member) 10 may be placed thereon. A second member 20*b* for a permeable confinement member may be placed on the polymer member 10. In other words, the polymer member 10 may be placed between the first member 20*a* and the second member 20*b*. Then, it is possible to form a 'permeable confinement member' to securely receive the polymer member 10 by bonding (coupling) the edge portion of the first member 20*a* or a portion adjacent thereto to the edge portion of the second member 20*b* or a portion adjacent thereto. As a non-limiting example, the edge portion of the first member 20*a* or a portion adjacent thereto may be joined to the edge portion of the second member 20*b* or a portion adjacent thereto according to a method for applying an adhesive and applying heat and pressure. The permeable confinement member may correspond to the permeable confinement member 20 described in FIG. 1.

However, the method of manufacturing the polymer-based turgor actuator is not limited to the above and may vary in various ways. Furthermore, the specific structure, shape, and the like of the permeable confinement member may vary. For example, the permeable confinement member may be provided with an opening and closing part which may be opened and closed, and the polymer member 10 may be placed therein through the opening and closing part.

Figure 6:
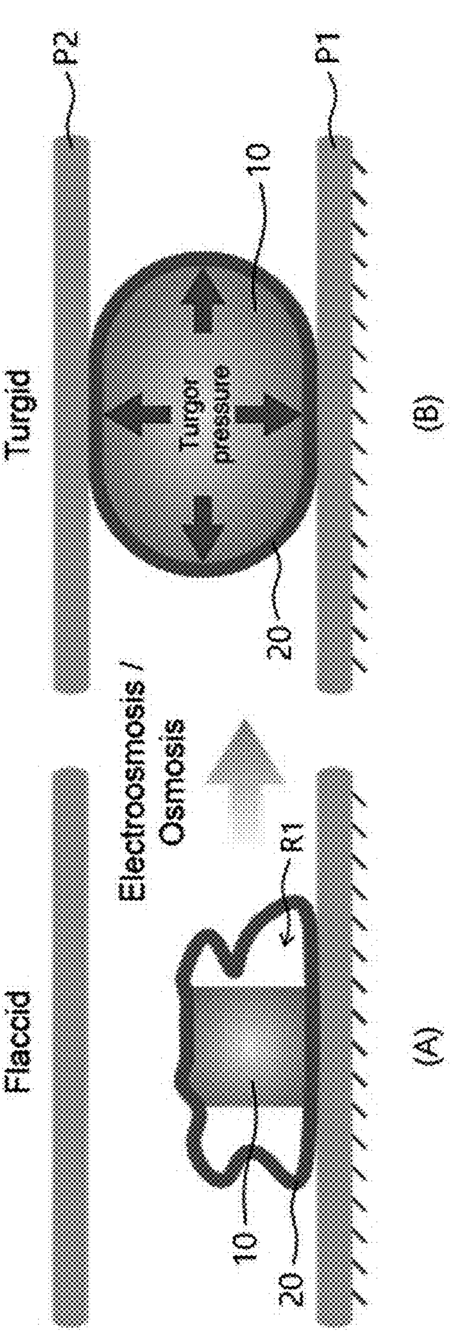
FIG. 6 is a cross-sectional view illustrating a method for driving a polymer-based turgor actuator according to an embodiment of the present invention.

FIG. 6 is a cross-sectional view illustrating a method for driving a polymer-based turgor actuator according to an embodiment of the present invention.

Referring to FIG. 6, the polymer-based turgor actuator according to an embodiment of the present invention may be driven to transmit a turgor pressure (swelling pressure) as mechanical output by swelling the polymer member 10 through osmosis phenomenon or electroosmosis phenomenon. A method for driving a polymer-based turgor actuator according to an embodiment may include a step for immersing the polymer-based turgor actuator in a liquid or contacting the liquid. When using the electroosmotic phenomenon, the method for driving the polymer-based turgor actuator according to the embodiment may further include a step for applying an electric field to the polymer member 10. The polymer member 10 may swell more rapidly under the application of the electric field. As a non-limiting example, the electric field may be on the order of several V/cm to several hundreds of V/cm, or on the order of several V/cm to several tens of V/cm.

Figure 7:
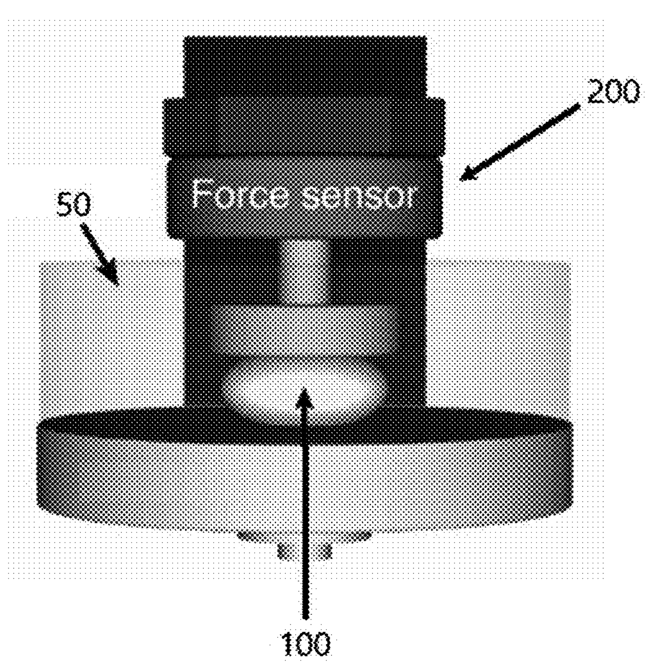
FIG. 7 is a schematic diagram illustrating a method for measuring the mechanical output of a polymer-based turgor actuator according to an embodiment of the present invention.

FIG. 7 is a schematic diagram illustrating a method for measuring the mechanical output of a polymer-based turgor actuator according to an embodiment of the present invention.

Referring to FIG. 7, when the polymer-based turgor actuator 100 according to an embodiment of the present invention is immersed in a predetermined liquid 50 and the polymer member swells due to osmosis phenomenon, the force generated by the polymer-based turgor actuator 100 may be measured by using a measuring device 200. The polymer-based turgor actuator 100 may be placed in the loading part of the measuring device 200, and the force which pushes the plate by swelling of the polymer member in the loading part, that is, the swelling of the polymer-based turgor actuator 100 may be measured. Here, the polymer member may include, for example, a hydrogel, and the liquid 50 may include, for example, deionized water (DI water). However, a material of the polymer member and a type of liquid 50 may vary.

Figure 8:
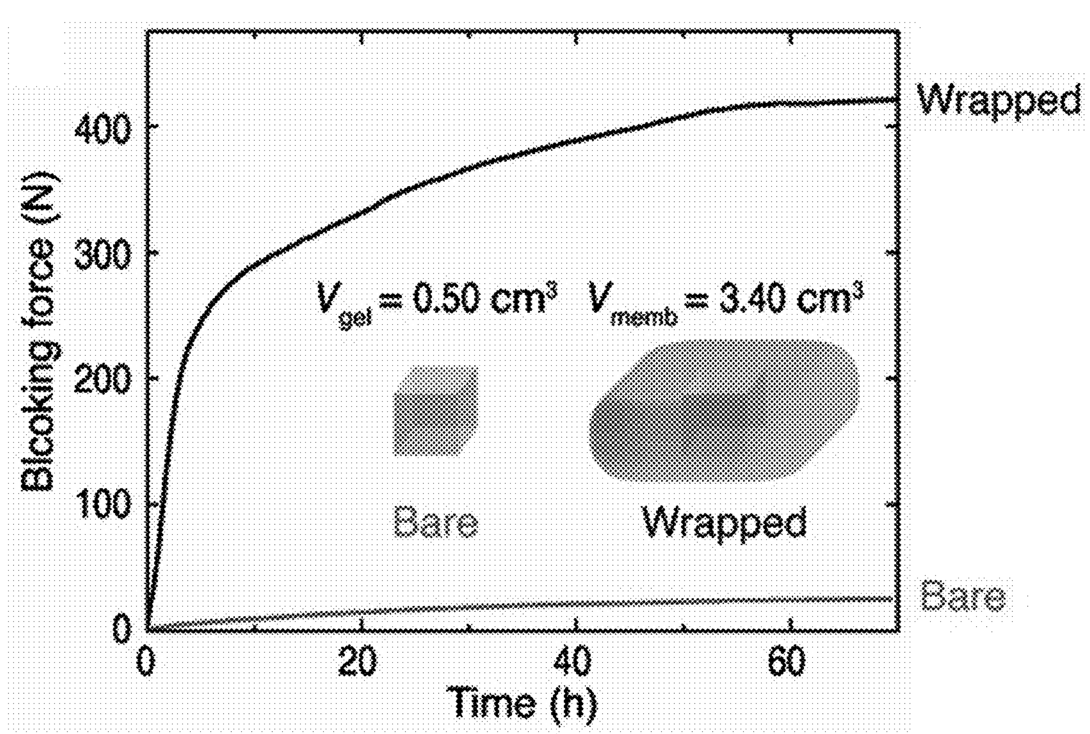
FIG. 8 is a graph showing the force generation pattern according to swelling of the polymer-based turgor actuator according to an embodiment of the present invention and the polymer actuator according to a comparative example.

FIG. 8 is a graph showing the force generation pattern according to swelling of the polymer-based turgor actuator according to an embodiment of the present invention and the polymer actuator according to a comparative example. The polymer-based turgor actuator according to the above embodiment has the structure described in FIG. 1, and the polymer actuator according to the comparative example has the structure described in FIG. 2. In the polymer-based turgor actuator according to the above embodiment and the polymer actuator according to the comparative example, the initial volume ($V_{gel}$) of the polymer member was 0.50 $cm^3$. In the polymer-based turgor actuator according to the above embodiment, the acceptable volume ($V_{memb}$) of the internal accommodation space of the permeable confinement member was 3.40 $cm^3$.

Referring to FIG. 8, it may be seen that the polymer-based turgor actuator according to an embodiment of the present invention generates a force of about 400 N by using a polymer member having an initial volume ($V_{gel}$) of 0.50 $cm^3$. Meanwhile, in the case of the polymer actuator according to the comparative example, the magnitude of force which could be generated was relatively very small.

Figure 9:
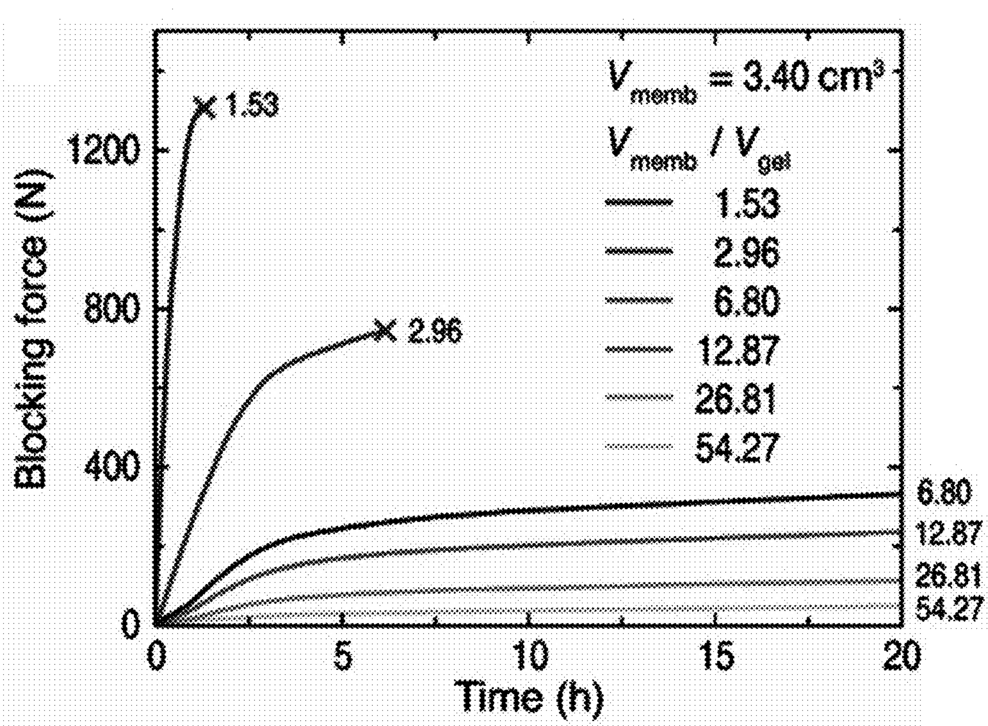
FIG. 9 is a graph showing the change in force generation pattern according to the swelling ratio of the polymer-based turgor actuator according to an embodiment of the present invention.

FIG. 9 is a graph showing the change in force generation pattern according to the swelling ratio of the polymer-based turgor actuator according to an embodiment of the present invention. In the polymer-based turgor actuator according to the above embodiment, the acceptable volume ($V_{memb}$) of the permeable confinement member was 3.40 $cm^3$. The swelling ratio ($V_{memb}/V_{gel}$) was variously adjusted by varying the initial volume ($V_{gel}1$) of the polymer member. Here, the swelling ratio ($V_{memb}/V_{gel}$) may be the same concept as the swelling ratio ($V/V_0$) described in FIGS. 1 and 3. That is, in the swelling ratio ($V_{memb}/V_{gel}$), $V_{gel}$ may be the volume of the polymer member in the initial state in which the polymer member is not swollen, and $V_{memb}$ may be a volume of the polymeric member in a fully swollen state (a state swollen to the maximum) until the polymeric member reaches an equilibrium in the internal accommodation space of the permeable confinement member.

Referring to FIG. 9, it may be seen that as the swelling ratio of the polymer member is reduced inside the permeable confinement member of the polymer-based turgor actuator within the measured range, a higher osmotic pressure may be maintained. Within the range measured in this experiment, it may be confirmed that when the swelling ratio is 1.53, a force of up to 1330 N may be reached at a faster speed.

Figure 10:
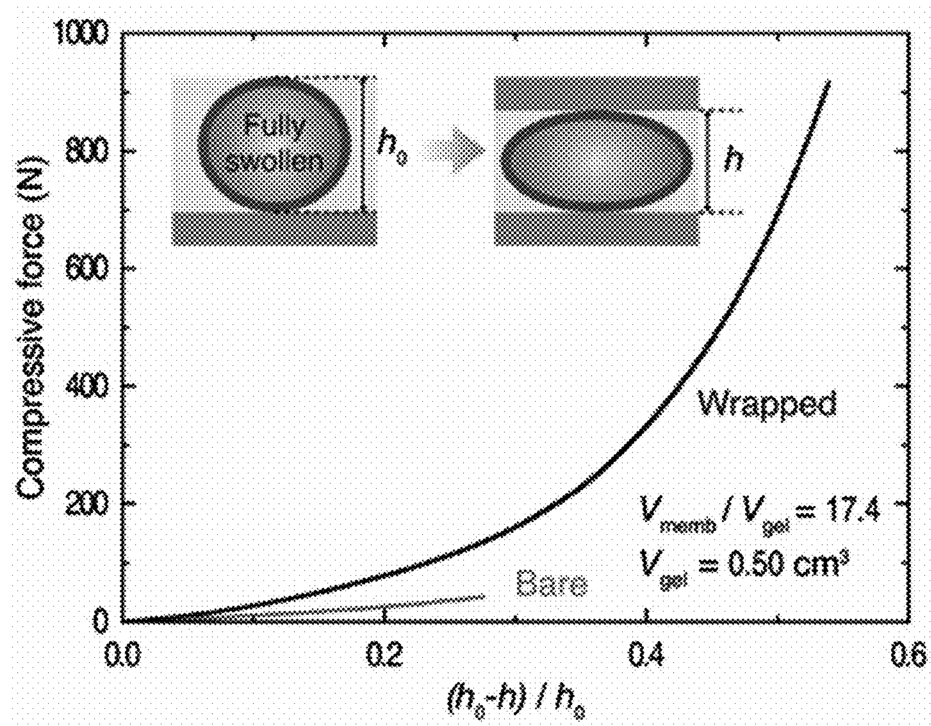
FIG. 10 is a graph showing the change in compression force versus the transformation of the polymer-based turgor actuator according to an embodiment of the present invention and the polymer actuator according to a comparative example.

FIG. 10 is a graph showing the change in compression force versus the transformation of the polymer-based turgor actuator according to an embodiment of the present invention and the polymer actuator according to a comparative example. That is, FIG. 10 shows the change in compression force as compared to the transformation of the actuator depending on the presence or absence of the permeable confinement member. The polymer-based turgor actuator according to the above embodiment has the structure described in FIG. 1, and the polymer actuator according to the comparative example has the structure described in FIG. 2. In the polymer-based turgor actuator according to the above embodiment and the polymer actuator according to the comparative example, the initial volume ($V_{gel}$) of the polymer member was 0.50 $cm^3$. The swelling ratio ($V_{ememb}/V_{gel}$) of the polymer-based turgor actuator according to the above embodiment was 17.4.

Referring to FIG. 10, when there is no permeable confinement member (i.e., in the case of the comparative example), the withstanding force of the polymer member is only about 40 N, but when the same polymer member is wrapped with a permeable confinement member (i.e., in the case of the embodiment), it may be confirmed that it may withstand a load of about 900 N.

Figure 11:
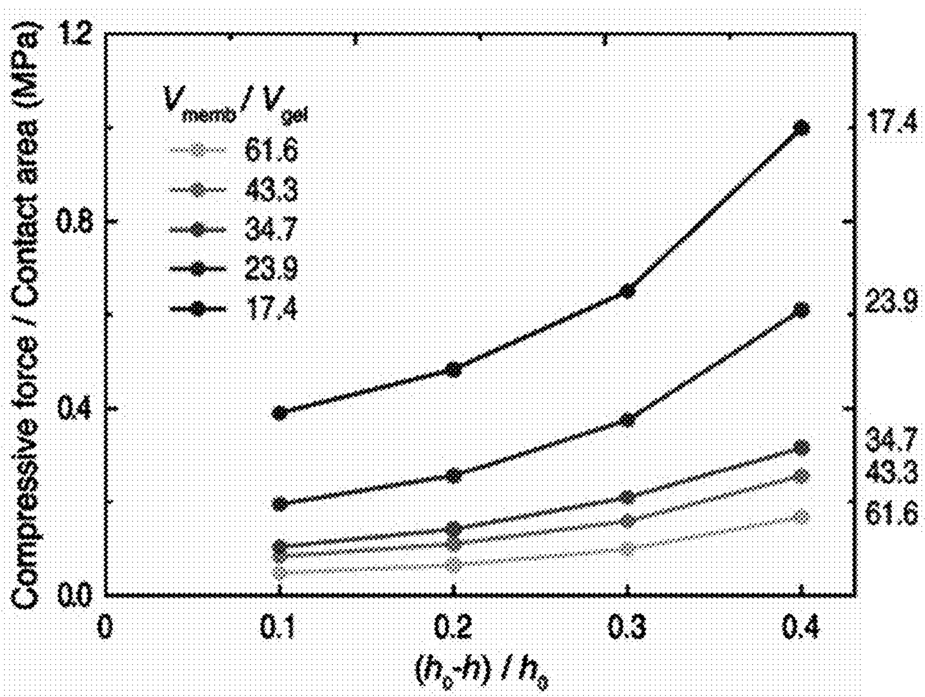
FIG. 11 is a graph showing the change in a true stress versus a strain due to the swelling ratio of the polymer-based turgor actuator according to an embodiment of the present invention.

FIG. 11 is a graph showing the change in a true stress versus a strain due to the swelling ratio of the polymer-based turgor actuator according to an embodiment of the present invention.

Referring to FIG. 11, as the swelling ratio ($V_{memb}/V_{gel}$) of the polymer member decreases within the measured range, the osmotic pressure maintained inside the permeable confinement member increases. Thus, the stress for initial deformation rapidly increases, and the stiffness (i.e., the slope of the graph) also increases.

Figure 12:
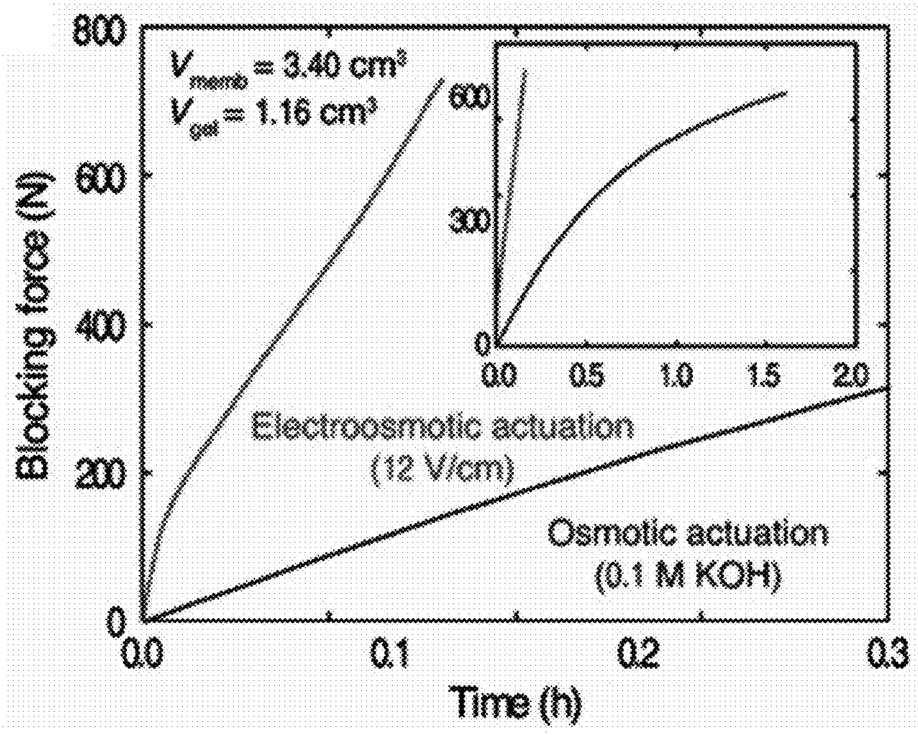
FIG. 12 is a graph showing a force generation pattern according to swelling due to each of osmosis and electroosmosis of the polymer-based turgor actuator according to an embodiment of the present invention.

FIG. 12 is a graph showing a force generation pattern according to swelling due to each of osmosis and electroosmosis of the polymer-based turgor actuator according to an embodiment of the present invention. At this time, $V_{gel}$ was 1.16 $cm^3$ and $V_{memb}$ was 3.40 $cm^3$. The inset in FIG. 12 shows data at a large scale. In the case of swelling using osmosis, swelling of the polymer member was performed by using a 0.1 M KOH aqueous solution. Meanwhile, in the case of swelling using electroosmosis, swelling was performed by applying an electric field of 12 V/cm to the polymer member while using a 0.1 M KOH aqueous solution.

Referring to FIG. 12, when using the electroosmotic phenomenon, the polymer member may generate a large force at a high speed under an electric field. Therefore, when a polymer electrolyte (polyelectrolyte) which may utilize the electroosmotic phenomenon is applied to a polymer member and swelling is performed while applying an electric field, it is possible to implement a turgor actuator which may generate a large force at a high speed.

FIG. 13 is a graph comparing a force and a speed of the polymer-based turgor actuator according to an embodiment of the present invention and existing soft actuators.

Figure 14:
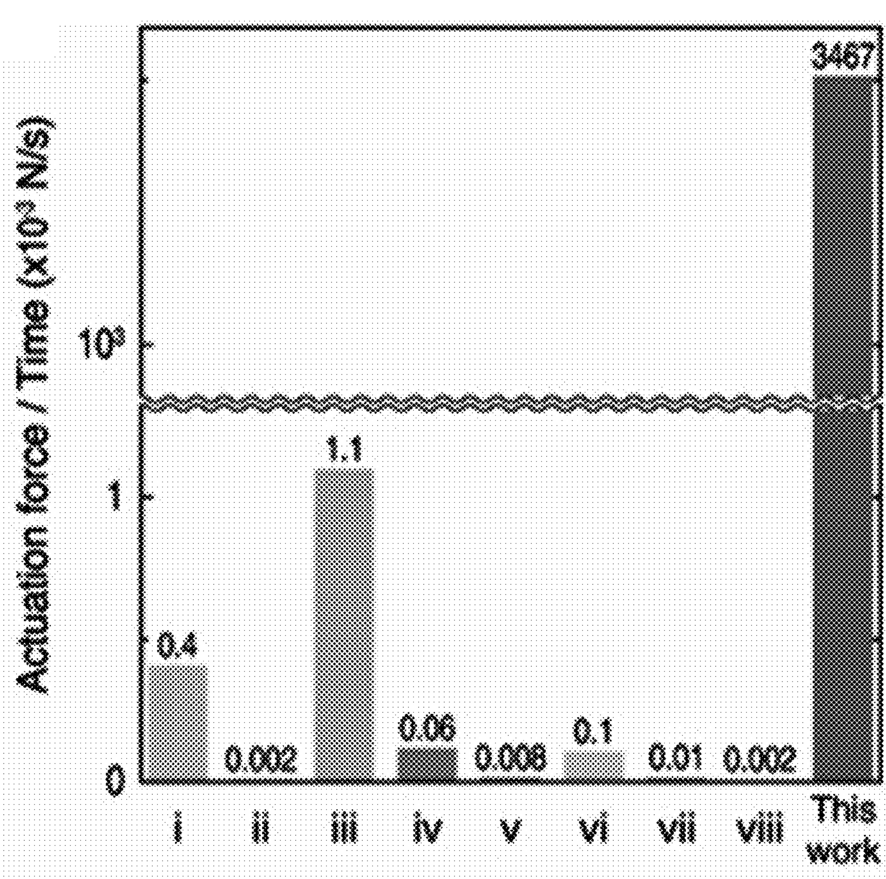
FIG. 14 is a graph comparing a force generated per unit time between the polymer-based turgor actuator according to an embodiment of the present invention and existing soft actuators.

FIG. 14 is a graph comparing a force generated per unit time between the polymer-based turgor actuator according to an embodiment of the present invention and existing soft actuators.

FIG. 13 and FIG. 14 include data of eight existing soft actuators (i, ii, iii, iv, v, vi, vii, viii). The data indicated as 'this work' in each of FIGS. 13 and 14 corresponds to an embodiment of the present invention.

Referring to FIG. 13, it may be seen that the polymer-based turgor actuator according to an embodiment of the present invention may generate a large force at a faster speed as compared to existing soft actuators.

Referring to FIG. 14, it may be seen that the polymer-based turgor actuator according to an embodiment of the present invention may generate a force per unit time which is remarkably greater than that of existing soft actuators.

Figure 15:
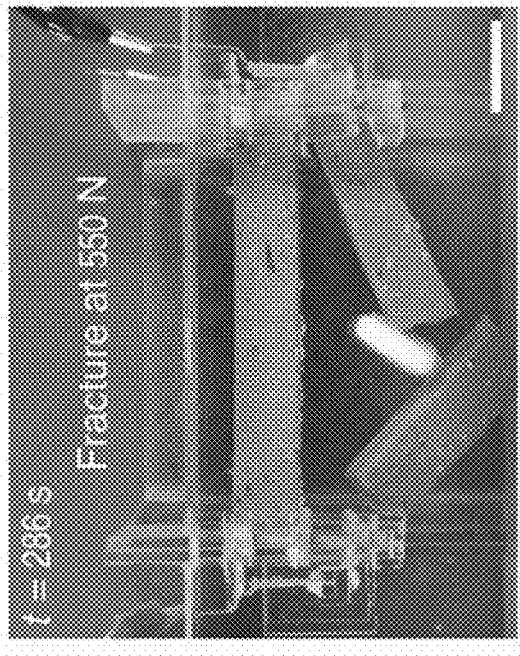
FIG. 15 is a photographic image showing the results of a destruction experiment using a polymer-based turgor actuator according to an embodiment of the present invention.
Figure 15:
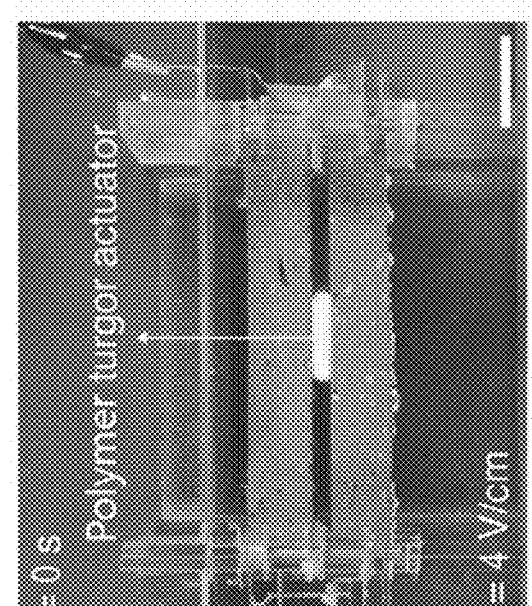

FIG. 15 is a photographic image showing the results of a destruction experiment using a polymer-based turgor actuator according to an embodiment of the present invention.

Referring to FIG. 15, a brick breaking experiment was conducted in order to show that the polymer-based turgor actuator according to an embodiment of the present invention may be used for purposes which may generate strong force and to intuitively confirm a strength of that force. The polymer-based turgor actuator may have the structure described with reference to FIG. 1. Swelling was performed by applying an electric field of 4 V/cm for about 5 minutes to a turgor actuator containing a small amount of polymer network member having an initial volume of 0.6 $cm^3$, and as a result, a brick having a breaking strength of 550 N was destroyed. In FIG. 15, the scale bar represents 3 cm.

Figure 16:
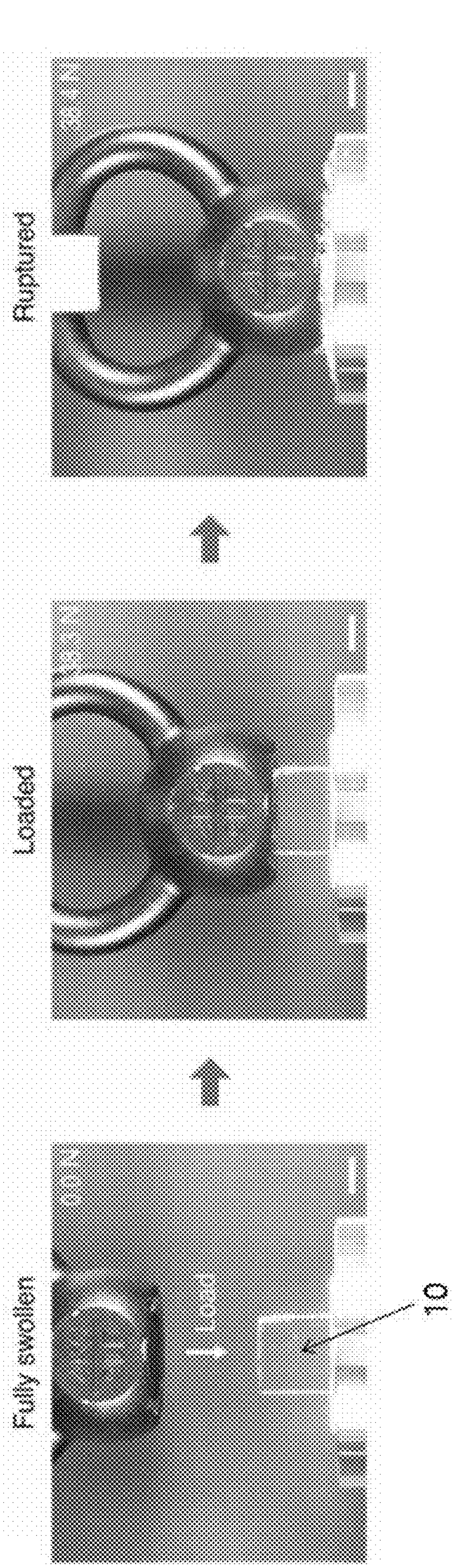
FIG. 16 is a photographic image showing the results of an experiment to confirm the physical strength of the polymer actuator according to a comparative example.

FIG. 16 is a photographic image showing the results of an experiment to confirm the physical strength of the polymer actuator according to the comparative example. The polymer actuator according to the comparative example is composed only of the polymer member 10 without a permeable confinement member.

Referring to FIG. 16, it may be seen that the polymer member 10 of the polymer actuator according to the comparative example is easily broken even by a 4 kg kettlebell. The polymer member 10 to which the permeable confinement member is not applied has weak strength.

Figure 17:
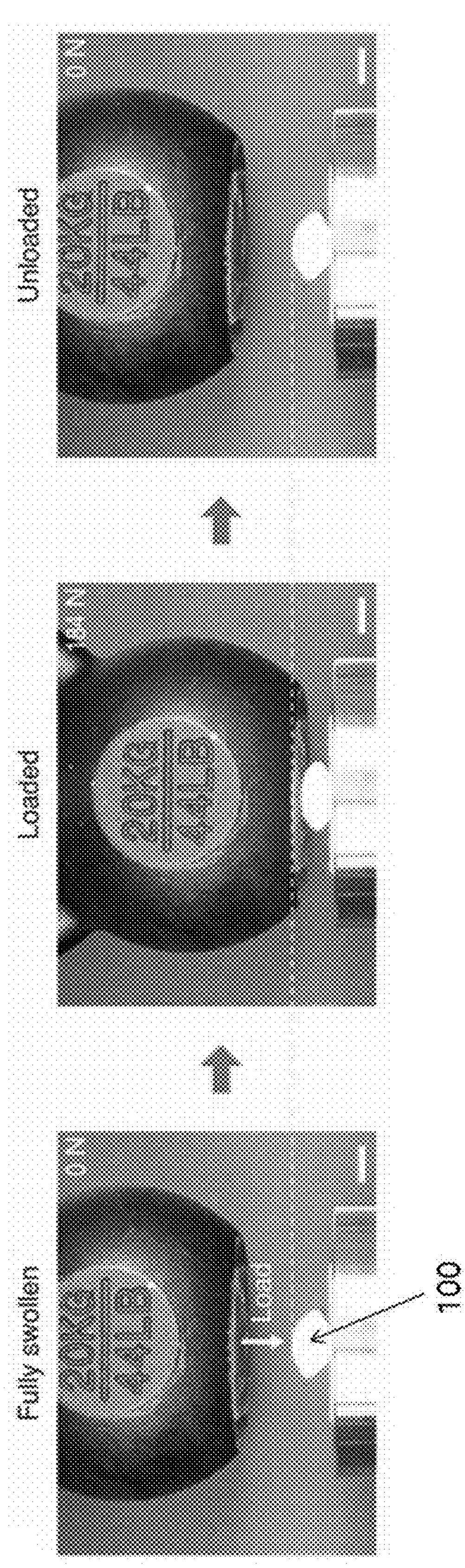
FIG. 17 is a photographic image showing the results of an experiment to confirm a physical strength of the polymer-based turgor actuator according to an embodiment of the present invention.

FIG. 17 is a photographic image showing the results of an experiment to confirm a physical strength of the polymer-based turgor actuator according to an embodiment of the present invention. The polymer-based turgor actuator (i.e., 100) according to the above embodiment may include a structure in which a polymer member is confined within a permeable confinement member.

Referring to FIG. 17, it may be seen that the polymer-based turgor actuator 100 according to an embodiment of the present invention may withstand well without breaking even when a 20 kg kettlebell is placed on it. A polymer member wrapped by a permeable confinement member may have high strength. Therefore, the polymer-based turgor actuator 100 according to the embodiment may be suitable for application as underwater/floating structures and architectures.

An underwater structure and a floating structure (or an on-water structure) may be configured (manufactured) by applying the polymer-based turgor actuator according to the embodiments of the present invention described above. The examples are illustrated in FIG. 18 to FIG. 21.

Figure 18:
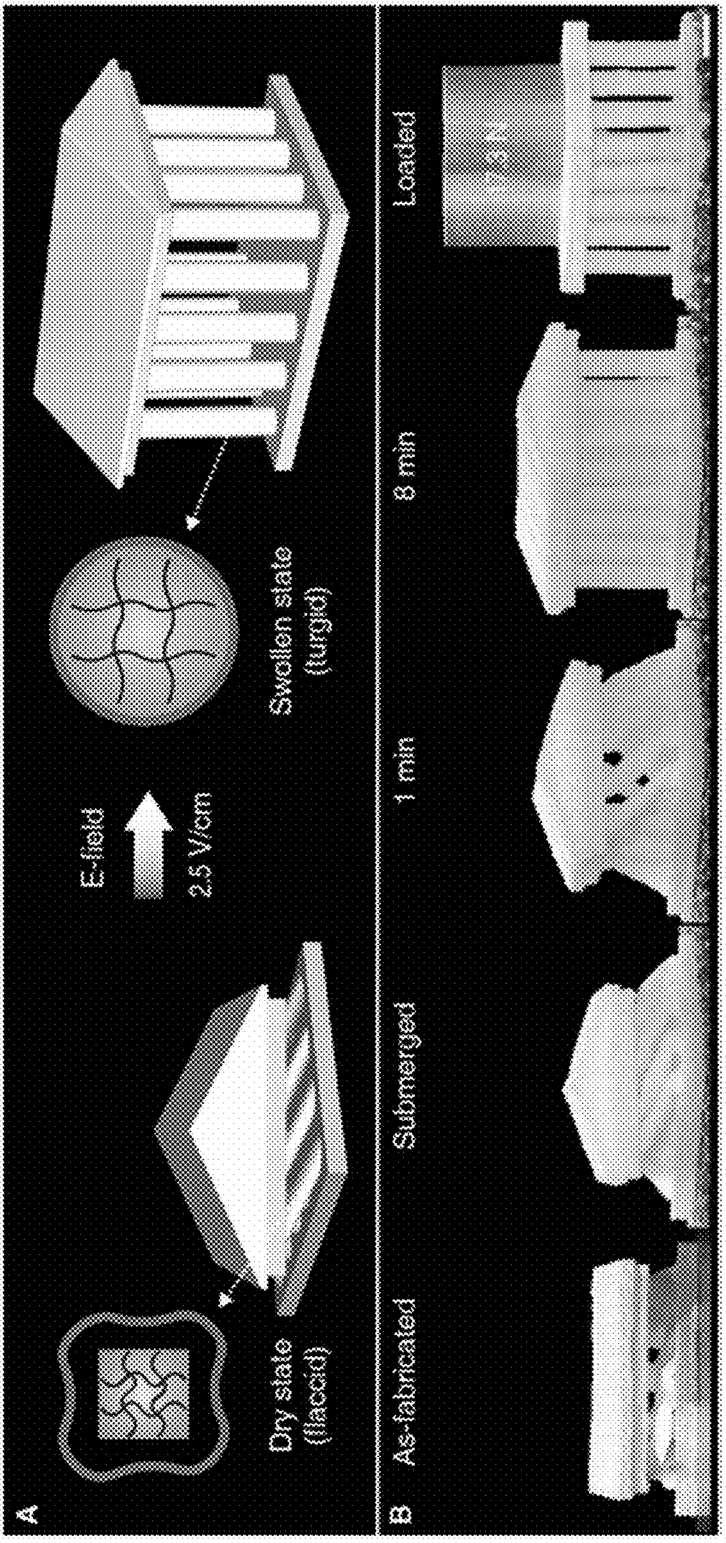
FIG. 18 is a diagram showing a process for manufacturing an underwater structure of a form of a Greek temple by applying a polymer-based turgor actuator according to an embodiment of the present invention.

FIG. 18 is a diagram showing a process for manufacturing an underwater structure of a form of a Greek temple by applying a polymer-based turgor actuator according to an embodiment of the present invention. The drawing (A) in FIG. 18 is a schematic diagram of the production of a Greek temple, and the drawing (B) is a photograph of an experiment over time.

Referring to FIG. 18, an underwater structure may be manufactured while swelling a polymer-based turgor actuator by using electroosmosis phenomenon in water. A small amount of polymer network member may swell under an electric field of 2.5 V/cm to create a strong structure in about 8 minutes. This structure had a strong turgor pressure and was able to withstand approximately 17.3 N.

Figure 19:
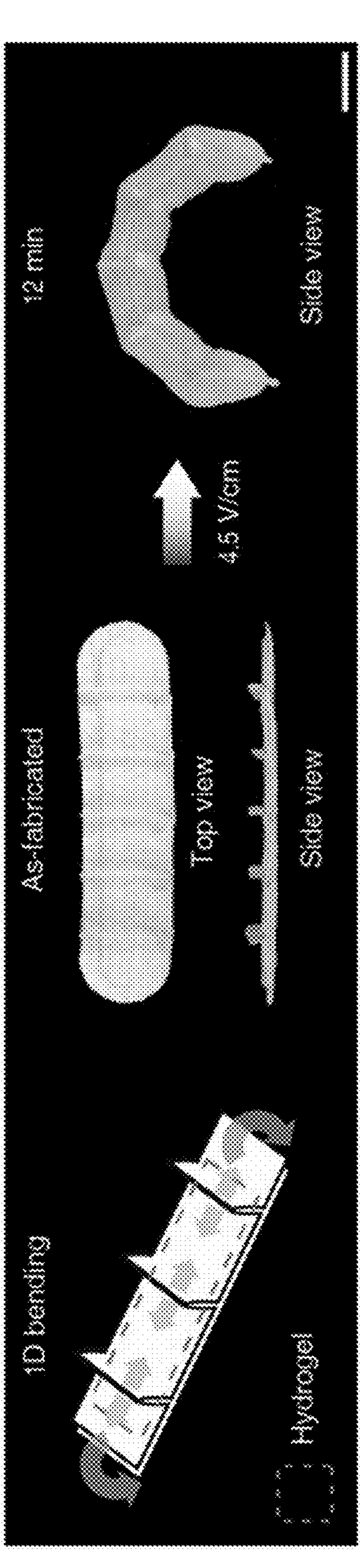
FIG. 19 is a diagram showing a process for manufacturing a structure (actuator) which performs bending actuation by applying a polymer-based turgor actuator according to an embodiment of the present invention.

FIG. 19 is a diagram showing a process for manufacturing a structure (actuator) which performs bending actuation by applying a polymer-based turgor actuator according to an embodiment of the present invention.

Referring to FIG. 19, a bending actuation of a linear (1D) structure may be implemented by using turgor actuation applying electroosmosis.

FIG. 20 is a diagram showing a process for manufacturing a structure (actuator) which performs bending actuation by applying a polymer-based turgor actuator according to an embodiment of the present invention.

Referring to FIG. 20, a bending actuation of a planar (2D) structure may be implemented by using turgor actuation applying electroosmosis.

Figure 21:
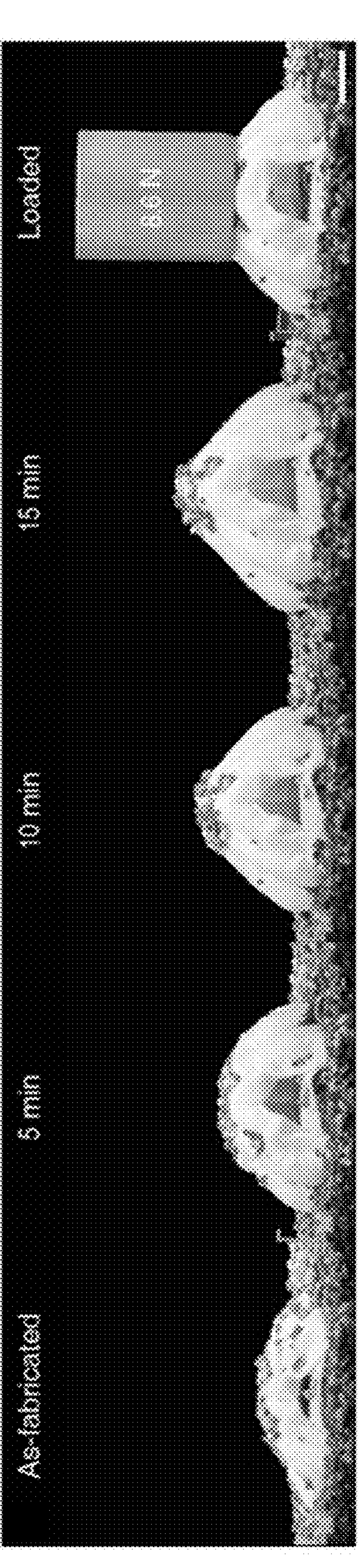
FIG. 21 is an experimental photographic image over time in manufacturing the structure of FIG. 20.

FIG. 21 is an experimental photographic image over time in manufacturing the structure of FIG. 20. Referring to FIG. 21, the structure was able to have a strong turgor pressure and withstand about 8.6 N.

The specific structures and the sizes of the underwater structures and floating structures described with reference to FIGS. 18 to 21 are merely examples and may be modified in various ways.

According to the embodiments of the present invention described above, it is possible to implement a polymer-based turgor actuator which may remarkably improve mechanical output performance (force, speed). Furthermore, according to embodiments of the present invention, it is possible to implement a polymer-based turgor actuator capable of generating a large force at a high speed. In addition, according to embodiments of the present invention, it is possible to implement a polymer-based turgor actuator which may easily control a generated force, an operation speed, and rigidity (degree of hardness).

According to embodiments of the present invention, the mechanical output performance (force, speed) of the polymer actuator may be greatly improved. A swelling pressure may be formed to generate mechanical output by confining a polymer network member capable of self-swelling within a permeable confinement member (e.g., permeable membrane) and swelling the polymer network member through osmosis or electroosmosis. Even without external power, for example, a force equal to the osmotic pressure equivalent to about several MPa may be generated, and when using electrical energy, a large force may be generated at a much faster speed. Furthermore, since the swollen actuator generates a very large swelling pressure, it may be utilized as a rigid structure. In addition, a force generated by the actuator, an operation speed, rigidity, and etc. may be easily controlled by adjusting the volume or physical properties of the permeable confinement member (e.g., permeable membrane) and/or the volume or physical properties of the polymer network member. Furthermore, if a stimulus-responsive polymer network is applied to a polymer network member, the hardness may be reversibly adjusted depending on the electric field or ion concentration. Here, the stimulus-responsive polymer network may be a substance which may control shrinkage or swelling in response to various stimuli, such as light, pH, and electric fields. To this end, the terminal groups of the stimulus-responsive polymer network may be adjusted.

In addition, according to embodiments of the present invention, it is possible to implement a polymer-based turgor actuator which may be manufactured in a state that is easy to handle because of a compact volume and a light weight, and thus, may be easily transported, and may act as a fixture with strong force or form a hard/rigid structure by absorbing a liquid (solvent) on its own in an underwater/on-water environment without a pump, a connection device, or an electrically driven equipment after transportation. As compared to the existing pneumatic actuators, there is no need for additional pumps and connection devices, and it may be driven by itself by sucking in surrounding liquid by using the osmotic pressure of the polymer network itself. It is expected that the polymer-based turgor actuator according to these embodiments will be able to overcome the limitations of existing construction.

Furthermore, in an embodiment of the present invention, a turgor actuator may be manufactured by using only a permeable confinement member which allows liquid to pass through and has a relatively large elastic modulus and a relatively small amount of polymer network as compared to the total volume of the structure, which is advantageous in terms of mass production and economic efficiency.

Recently, interest in floating buildings and underwater cities is increasing due to rising sea levels due to global warming, increased income, and increased demand for marine leisure sports due to changes in tourism behavior. Embodiments of the present invention may be used in actuators which may be driven underwater/on the water and underwater/floating structures, and may be usefully applied to floating buildings and underwater city projects.

Construction in underwater environments (e.g., bridges, undersea tunnels, etc.) requires complex and difficult processes, unlike terrestrial construction, because use of electrically driven equipment is limited, and buoyancy must be taken into account. The actuator proposed in this embodiment of the present invention is small in volume and light, making it easy to handle, and may absorb the underwater environment on its own and form a hard/rigid structure without the need for electrically driven equipment, thereby overcoming the limitations of existing construction.

In addition, embodiments of the present invention may be applied to all application fields of soft actuators using polymer networks, such as artificial muscles, soft robotics, and biomedical engineering.

In the present specification, the preferred embodiments of the present invention have been disclosed, and although specific terms are used, these are only used in a general sense to easily describe the technological contents of the present invention and to help the understanding of the present invention, and are not used to limit the scope of the present invention. It will be apparent to those of ordinary skill in the art to which the present invention pertains that other modifications based on the technological spirit of the present invention may be implemented in addition to the embodiments disclosed herein. It will be appreciated to those of ordinary skill in the art that the polymer-based turgor actuators, driving methods thereof, and structures to which the same is applied according to the embodiments described with reference to FIGS. 1, 3 to 15, and 17 to 21 may be variously substituted, changed and modified without departing from the spirit of the present invention. Therefore, the scope of the invention should not be determined by the described embodiments, but should be determined by the technological concepts described in the claims.

INDUSTRIAL APPLICABILITY

The embodiments of the present invention may be used in actuators which may be driven underwater/on-water and underwater/floating structures, and may be applied to floating buildings and underwater city projects. In addition, the embodiments of the present invention may be applied to all application fields of soft actuators using polymer networks, for example, the application fields such as artificial muscles, soft robotics, biomedical engineering, and the like.

The invention claimed is:

1. A polymer-based turgor actuator comprising:

a polymer network member capable of absorbing liquid and tending to swell due to an osmotic pressure difference with an external liquid; and a permeable confinement member accommodating the polymer network member therein, the permeable confinement member being configured to allow permeation of the liquid while mechanically restricting volumetric expansion of the polymer network member, wherein the permeable confinement member defines an internal accommodation space having an acceptable volume smaller than a maximum swelling volume of the polymer network member in a free-swelling state, such that swelling of the polymer network member is suppressed and a turgor pressure is maintained in the polymer network member to provide a mechanical output.

2. The polymer-based turgor actuator of claim 1, wherein the acceptable volume of the internal accommodation space of the permeable confinement member is 60% or less of the maximum swelling volume of the polymer member in the absence of the permeable confinement member.

3. The polymer-based turgor actuator of claim 1, wherein the acceptable volume of the internal accommodation space of the permeable confinement member is larger than an initial volume before swelling of the polymer member.

4. The polymer-based turgor actuator of claim 1, wherein the permeable confinement member has an elastic modulus of 1 MPa or more.

5. The polymer-based turgor actuator of claim 1, wherein the permeable confinement member includes a permeable membrane surrounding the polymer member.

6. The polymer-based turgor actuator of claim 1, wherein the permeable confinement member has a mesh structure.

7. The polymer-based turgor actuator of claim 1, wherein the polymer member is configured to absorb liquid and to swell through osmosis phenomenon or electroosmosis phenomenon.

8. The polymer-based turgor actuator of claim 1, wherein the polymer member includes a polymer electrolyte, wherein the polymer-based turgor actuator further comprises an electric field application device for applying an electric field to the polymer member.

9. A method for driving the polymer-based turgor actuator of claim 1, the method comprising immersing the polymer-based turgor actuator in a liquid or contacting it with a liquid.

10. The method for driving the polymer-based turgor actuator of claim 9, further comprising applying an electric field to the polymer member of the polymer-based turgor actuator.

11. An underwater structure configured by applying the polymer-based turgor actuator of claim 1.

12. A floating structure configured by applying the polymer-based turgor actuator of claim 1.

13. The polymer-based turgor actuator of claim 1, wherein the polymer member includes a polymer electrolyte.

14. The polymer-based turgor actuator of claim 1, wherein the polymer-based turgor actuator further comprises an electric field application device for applying an electric field to the polymer member.

* * * * *